(12) United States Patent
Tominaga et al.

(10) Patent No.: US 7,306,848 B2
(45) Date of Patent: Dec. 11, 2007

(54) TEMPERED GLASS SHEET, PROCESS AND APPARATUS THEREFOR

(75) Inventors: Hiromasa Tominaga, Tokyo (JP); Kazushige Yoda, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 579 days.

(21) Appl. No.: 10/614,899

(22) Filed: Jul. 9, 2003

(65) Prior Publication Data
US 2004/0007022 A1 Jan. 15, 2004

(30) Foreign Application Priority Data
Jul. 10, 2002 (JP) .............................. 2002-201496

(51) Int. Cl.
*B32B 17/06* (2006.01)
(52) U.S. Cl. ...................... 428/410; 428/409; 428/426
(58) Field of Classification Search ................ 428/409, 428/410, 426
See application file for complete search history.

(56) References Cited

U.S. PATENT DOCUMENTS

| | | | |
|---|---|---|---|
| 3,186,815 A | 6/1965 | Jochim | |
| 3,223,501 A | * 12/1965 | Fredley et al. | ................ 65/25.2 |
| 4,323,385 A | 4/1982 | Gintert et al. | |
| 4,508,783 A | 4/1985 | Aubry et al. | |
| 5,112,377 A | 5/1992 | Aratani | |
| 5,536,995 A | * 7/1996 | Sugawara et al. | ...... 313/477 R |
| 6,412,309 B1 | 7/2002 | Kajii et al. | |

FOREIGN PATENT DOCUMENTS

| | | |
|---|---|---|
| GB | 806 999 | 1/1959 |
| JP | 6-24995 | 4/1994 |
| JP | 2001-26434 | 1/2001 |

OTHER PUBLICATIONS

Patent Abstracts of Japan, JP 58-088132, May 26, 1983.
Patent Abstracts of Japan, JP 56-045833, Apr. 25, 1981.

* cited by examiner

*Primary Examiner*—G. Blackwell
(74) *Attorney, Agent, or Firm*—Oblon, Spivak, McClelland, Maier & Neustadt, P.C.

(57) ABSTRACT

A tempered glass sheet having in its front view a peripheral region including the peripheries, and a central region (9) occupying inside the peripheral region, wherein the average surface compressive stress in the central region (9) is larger than the average surface compressive stress in the peripheral region, is presented, whereby a tempered glass sheet having a thickness thinner than conventional ones can be provided.

10 Claims, 6 Drawing Sheets

Distance from the gravity point

TEMPERED GLASS SHEET, PROCESS AND APPARATUS THEREFOR

The present invention relates to a tempered glass sheet, a process and an apparatus therefor.

In recent years, social interests in environmental issues have been growing. In automobile industries, fuel-efficient automobiles have strongly been demanded, and measures such as reducing the weight of the body have become necessary. Thus, reducing the weight of automobile parts is more strongly demanded than before, and a windowpane for automobiles is not an exception.

As a windowpane for automobiles, in order to ensure the safety of persons in the car, a laminated glass is used for an windshield, and a tempered glass sheet is used for e.g. a door windowpane or a rear windowpane except for some type of automobiles. Therefore, reducing the weight of the tempered glass sheet, namely, reducing the thickness of the tempered glass sheet results in reducing the weight of automobiles.

A tempered glass sheet for automobiles is commonly produced by cool-air tempering described as follows. At first, a glass sheet is conveyed into a heating furnace and heated at a temperature close to the softening point. The glass sheet is taken out of the furnace after being shaped, or is shaped after being taken out of the furnace, and quenched immediately by blowing a cooling air to the surface of the glass sheet. The cooling air is brown to the glass sheet from a plurality of cooling nozzles disposed at both sides of the glass sheet. At this time, the temperature drop is quicker at the surface of the glass sheet than at the its inner portion, and accordingly, a temperature difference is produced between the inside and the surface in the cross-sectional direction, with the results of producing a tensile thermal stress at the surface and a compressive thermal stress inside. However, when the glass temperature is close to the softening point, viscous flowage occurs in the glass to relax the thermal stress by a stress relaxation effect. Accordingly, there is little stress in the glass sheet in spite of the temperature difference between the inside and the surface in the cross-sectional direction of the glass sheet.

A glass is an elastic body at the room temperature. When the glass sheet is cooled to reach finally the room temperature, there occurs the reversal of the direction of the heat stress relaxed at the time of high temperature to thereby form a residual compressive stress layer at the surface and a residual tensile stress layer inside the glass sheet, whereby a tempered glass sheet is produced.

Since a tempered glass sheet is produced by the process described above, the magnitude of the residual stress in the tempered glass sheet depends on the thermal stress produced by a temperature distribution between the inside and the surface in the cross-sectional direction of the glass sheet at the time of quenching, and its relaxation effect. Therefore, the thinner the thickness of the glass sheet is, the more difficult it is to increase the temperature difference between the surface of the glass sheet and the inside of the glass sheet, and the smaller the residual stress becomes. The decrease of the residual compressive stress at the surface of the glass sheet invites the decrease of the strength of the glass sheet. The decrease of the residual tensile stress inside the glass sheet invites the decrease of the number of fragments produced by breakage of the glass sheet and the increase of the area of each fragment. As the fragments become larger, sharp edges tend to appear in the glass fragments, and the breakage of the glass is dangerous.

There is legislation of automobile tempered glass sheet to cope with this issue, in which a regulation is provided as to the state of fragments produced by fragmenting a tempered glass sheet by applying a local shock to the tempered glass sheet. Namely, it prescribes that when a tempered glass sheet is fragmented, the area wherein the number of fragments in a 50×50 mm square is maximum and the area wherein that is minimum are selected, and the minimum and maximum numbers of fragments in these areas have to be within the allowable range, and that a tempered glass sheet not satisfying this regulation cannot be used as a tempered glass sheet for automobiles. Besides this, a regulation prescribes that there should be no elongated fragment (spline) having a length exceeding 75 mm and no fragment having an area exceeding the allowable maximum area. These regulations as to fragments at a time of fragmentation of a tempered glass sheet for automobiles are prescribed in e.g. ECE standards or JIS standards.

Namely, since the number of fragments at a time of fragmentation of a tempered glass sheet depends on the internal residual tensile stress, the reduction of the thickness of the glass sheet makes it difficult to obtain a residual stress required to satisfy the legislations provided for a tempered glass sheet for automobiles unless a person uses a process for producing a stronger residual stress in a tempered glass sheet than conventional processes for producing a tempered glass sheet.

The thicknesses of a tempered glass sheet for automobiles are used mainly from about 2.8 to 5 mm. In order to reduce the weight of the tempered glass sheet for automobiles, it is necessary to make the thickness thinner than the above-mentioned values. As a method for tempering a thin glass sheet, there can be considered a method of increasing the cooling capacity (the performance to cool a glass sheet by a cooling means) more than that for producing a tempered glass sheet having the thickness of from 2.8 to 5 mm so that a sufficient temperature difference can be provided between the inside and the surface in the cross-sectional direction of the glass sheet. The thin glass sheet mentioned here means a glass sheet having a thickness thinner than the currently used tempered glass sheets for automobiles.

In a case of cool-air tempering, a method of increasing the air pressure of cooling air or positioning the tips of nozzles closer to the glass sheet, is necessary to increase the cooling capacity. However, in order to increase the air pressure of the cooling air, the blower capacity have to be increased, which causes problems such as high cost and noise.

Figure 11:
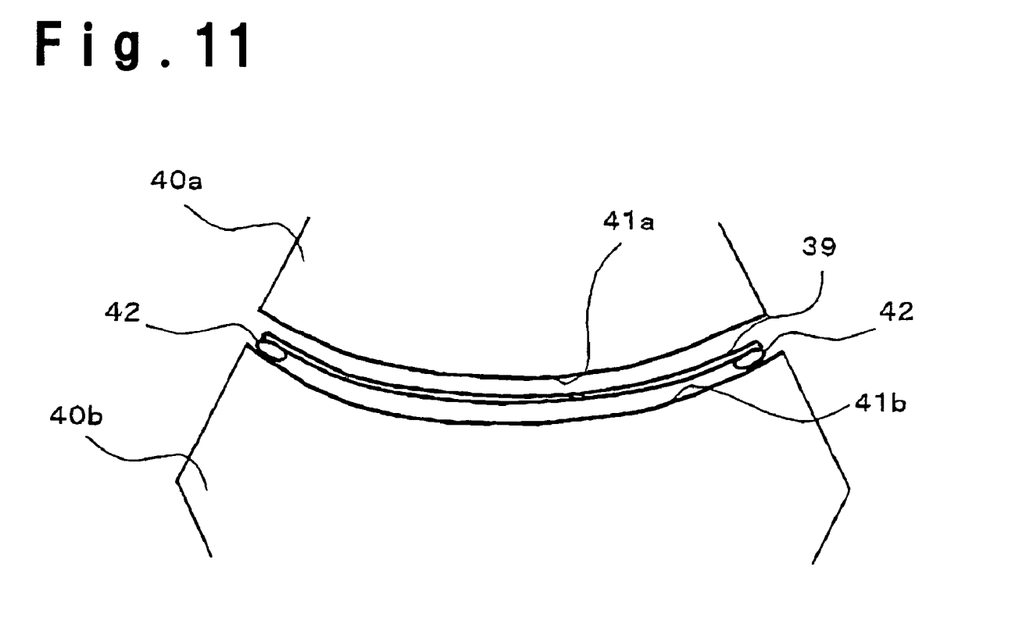
FIG. 11 is a schematic cross-sectional view of a conventional apparatus for producing a tempered glass sheet.

Further, for example, as illustrated in the schematic cross-sectional view of an apparatus for producing a conventional tempered glass sheet in FIG. 11, a technique of positioning a nozzle tip 41b close to a glass sheet 39 has a problem of causing interference with e.g. a jig such that a cooling ring 42 collides with the nozzle tip 41b and there is a limitation in positioning it closer. Further, when a tempered glass sheet is produced, the glass sheet needs to be swung so as not to form extreme spots of cooling (stress pattern) on the surface of the glass sheet at a time of quenching. However, a glass sheet having a complex curved surface cannot be swung if nozzle tips are positioned close to the glass sheet.

As another method for tempering a thin glass sheet, increasing the temperature of the glass sheet at the start of cooling can be considered. If the temperature of the glass sheet is high, it is considered that the temperature difference between the center and the surface of the glass sheet can be increased at the time of cooling and sufficient residual stress can be obtained. However, there arises another problem that the deterioration of the optical quality, is induced during the conveying and shaping the high temperature glass sheet, and therefore, the method of increasing the temperature of a glass sheet has a limitation.

As another method, a method of employing compressor air is known for tempering a thin glass sheet (for example, refer to patent documents 1: JP-B-6-24995 (FIGS. 2 to 5) and 2: JP-A-2001-26434 (FIGS. 1 to 4)). The method in the patent document 1 is such that in addition to blowing air to a glass sheet at a time of quenching, compressor air is added to utilize a shock wave of the compressor air, whereby the glass sheet is efficiently quenched by the blower air, and the temperature difference between the surface and inside of the glass sheet is increased to temper the thin glass sheet.

The method in the patent document 2 is such that compressor air is partially added to the blower air, and the compressor air is blown only to "the portion hard to cool", whereby "the portion hard to cool" in the glass sheet is cooled with a higher cooling capacity than other portions to be evenly cooled over the entire glass sheet, which reduces the equipment cost and operation cost as the issues of the invention of the patent document 1.

However, in the method in Patent Document 1, since the existing equipment have to be drastically modified to apply additionally the compressor air, and since equipment such as a large sized receiver tank needs to be installed to supply the compressor air stably, a large cost is required; the equipment becomes too large, and the operation cost will be increased.

Further, if the glass sheet heated to a temperature close to the softening point is quenched, a thermal stress in the tensile direction is produced at the surface of the glass sheet by the temperature difference between the surface and inside of the glass sheet. Since there is viscous flowage in the glass sheet, the thermal stress is relaxed by a stress relaxation effect. However, since the cooling capacity of this method is too high, the thermal stress produced immediately after the start of the quench becomes too large so that the relaxation speed can't catch up with the speed of generating the thermal stress, and the thermal stress not completely relaxed remains at the surface of the glass sheet as a tensile stress. By the effect of the tensile stress, fine cracks existing at the surface of the glass sheet may grow to destroy the glass sheet, which is a phenomenon called cooling destruction. Therefore, simply increasing the cooling capacity will increase the tensile stress generated at the surface of the glass sheet immediately after the start of the quench, and cause a problem that the cooling destruction more easily occurs.

Further, the method in the Patent Document 2 utilizing the compressor air as well also has a problem. The Patent Document 2 discloses that "the portion hard to cool" is the central portion of the glass sheet. However, there is no clear definition as to the central portion of the glass sheet, and the central portion described in the description on an embodiment shows a band-shaped region in the center from one side to the opposite side of the glass sheet. Namely, in the invention of the Patent Document 2, there is a problem that the tensile stress generated at the surface of the glass sheet immediately after the start of the quench becomes large, and the cracks grow from the periphery to cause the cooling destruction since the peripheral portion where the number of fine cracks is much more than the other portion of the glass sheet is cooled by a cooling means having a high cooling capacity such as the compressor air.

Further, although the equipment cost and the operating cost can be reduced as compared with the technique in the Patent Document 1, the existing equipment still have to be modified drastically, and the equipment cost and the operating cost will be increased from that used currently. Further, the compressor air causes a noise problem.

As described above, if the glass sheet is cooled by a high cooling capacity to obtain a desired residual stress satisfying the standards for the tempered glass sheet in the glass sheet of at most 2.8 mm thick, a problem such as cooling destruction or an increase of the equipment cost will be caused.

The present invention has been made to solve the above-mentioned conventional problems, and it is an object of the present invention to provide a tempered glass sheet for automobiles satisfying the safety standards even if the thickness of the glass sheet is reduced; to provide a process for producing the tempered glass sheet which reduces the cooling destruction caused by increasing the cooling capacity even if the thickness of the glass sheet is reduced, and to provide an apparatus for producing a tempered glass sheet without an increase of the equipment cost.

Here, the principle of the present invention will be described.

When a tempered glass sheet is fragmented, elastic waves are generated in addition to the generation of cracks, and propagated in all directions inside the glass sheet. The elastic waves propagate inside the tempered glass sheet at a speed of about two times (from 1.7 to 2.3 times) as much as a speed of the propagation of the cracks; reflect at the periphery of the glass sheet and meet the tips of cracks propagated with a delay with respect to the elastic waves. As a result, the direction of propagation of the cracks is branched, and the size of fragments in the peripheral region (the region outside the meeting points of the elastic waves and the cracks) of the tempered glass sheet is smaller than the size of the fragments in the central region (the region inside the meeting points where the elastic waves meet the cracks). Therefore, when the glass sheet is tempered, the degree of tempering in the central region and that in the peripheral region should be different. Namely, it is preferred to make the cooling capacity in the central region higher than the cooling capacity in the peripheral region.

Therefore, considering such principle, the present invention provides a tempered glass sheet comprising a residual compressive stress layer formed at the surface of the glass sheet and a residual tensile stress layer formed inside the glass sheet to increase the strength of the glass sheet by a balance of the residual stresses in these layers, wherein the tempered glass sheet has in its front view a peripheral region including the periphery and a central region occupying the inside of the peripheral region, and the average surface compressive stress in the central region is larger than the average surface compressive stress in the peripheral region whereby the above-mentioned conventional technical problems can be solved.

Further, as another aspect of the present invention, there is provided a process for producing a tempered glass sheet, comprising steps of heating a glass sheet at a temperature close to the softening point, and cooling the surface of the glass sheet by means of a cooling means to form a residual compressive stress layer at the surface of the glass sheet and a residual tensile stress layer inside the glass sheet, wherein the tempered glass sheet has in its front view a circular peripheral region including the periphery and a central region occupying the inside of the peripheral region, and the cooling capacity of a first cooling means for cooling the central region is from 16 to 78% larger than the cooling capacity of a second cooling means for cooling the peripheral region.

Further, as another aspect of the present invention, there is provided an apparatus for producing a tempered glass, comprising a furnace for heating a glass sheet at a temperature close to the softening point, and a cooling means having a plurality of nozzles for blowing a cooling medium against the surface of the glass sheet to form a residual compressive stress layer at the surface of the glass sheet and a residual compressive stress inside the glass sheet, wherein the tempered glass sheet has in its front view a circular peripheral region including the periphery and a central region occupying the inside of the peripheral region, and the distance from the tip of the nozzle for cooling the central region of the glass sheet to the surface of the glass sheet, is from 10 to 50 mm shorter than the distance from the tip of the nozzle for cooling the peripheral region of the glass sheet to the surface of the glass sheet.

Now, the present invention will be described in further detail with reference to drawings. Embodiment 1 concerns a tempered glass sheet produced according to the present invention, Embodiment 2 concerns an example of process for producing of the present invention, and Embodiments 3 and 4 concern apparatuses of the present invention.

Embodiment 1

Figure 1:
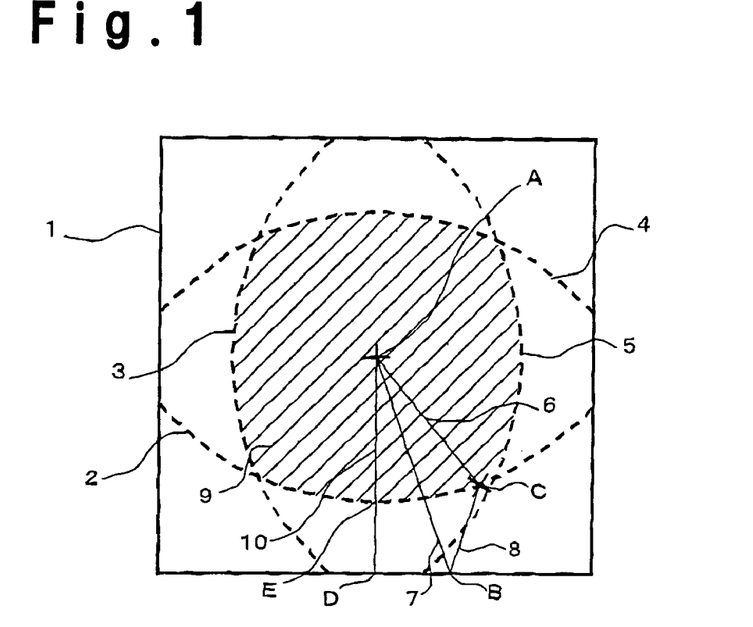
FIG. 1 is a conceptual view illustrating the central region and the peripheral region.

FIG. 1 is a conceptual view illustrating a tempered glass sheet according to Embodiment 1. A tempered glass sheet 1 has a square shape and has in its front view a peripheral region and a central region excluding the peripheral region. The central region is a region 9 at or near the center of the tempered glass sheet 1 shown in FIG. 1, and the peripheral region is a region near the periphery of the tempered glass sheet 1 other than the region 9.

The region 9 will be described in detail. A tempered glass sheet has a compressive stress layer at its surface and a tensile stress layer at its inside. By applying a local shock to the tempered glass sheet, cracks will be generated at the surface. When the cracks grow through the compressive stress layer to reach the tensile stress layer, they propagate in all directions in the glass sheet by tensile stress whereby the tempered glass sheet is destroyed into fragments. At this time, elastic waves are generated and propagated toward the periphery of the tempered glass sheet.

An elastic wave is a shear wave propagating in a concentric circular form from the origin point, which is generated at the same time as the cracks reaching the tensile stress layer and starting propagating in all directions in the glass sheet. The propagation speed of the elastic waves is faster than the propagation speed of the cracks. In Embodiment 1, as shown in FIG. 1, the dimension of the area 9 is determined assuming that the tempered glass sheet 1 is fragmented at the gravity center A and that the propagation speed of the elastic waves is twice the propagation speed of the cracks.

In FIG. 1, when the tempered glass sheet 1 is fragmented at the gravity point A as the origin point, an elastic wave propagated from the gravity point A along a line 7 leading to a point B at a lower periphery of the glass sheet 1, is regularly reflected at the point B and propagates along a line 8. Therefore, a crack originated at the gravity point A and propagated along a line 6 towards the lower periphery of the tempered glass sheet 1 meets the elastic wave propagated along the line 8 at a point C.

Thus, a line formed by connecting meeting points where the elastic waves reflected regularly at the lower periphery of the tempered glass sheet 1 meet cracks originated at the gravity point A and propagated towards the lower periphery, shown as a dashed line 2. In the same manner, a line formed by connecting meeting points where elastic waves reflected regularly at the left periphery of the tempered glass sheet 1 meet cracks originated at the gravity point A and propagated towards the left periphery, is shown as a dashed line 3, a line formed by connecting meeting points where elastic waves regularly reflected at the upper periphery of the tempered glass sheet 1 meet cracks originated at the gravity point A and propagated towards the upper periphery, is shown as a dashed line 4, and a line formed by connecting meeting points where elastic waves reflected regularly at the right periphery of the tempered glass sheet 1 meet cracks originated at the gravity point A and propagated towards the right periphery, is shown as a dashed line 5. An area surrounded by dashed lines 2 to 5 as the borderlines, is shown as a hatched area 9 hatched by upward-sloping lines.

Figure 2:
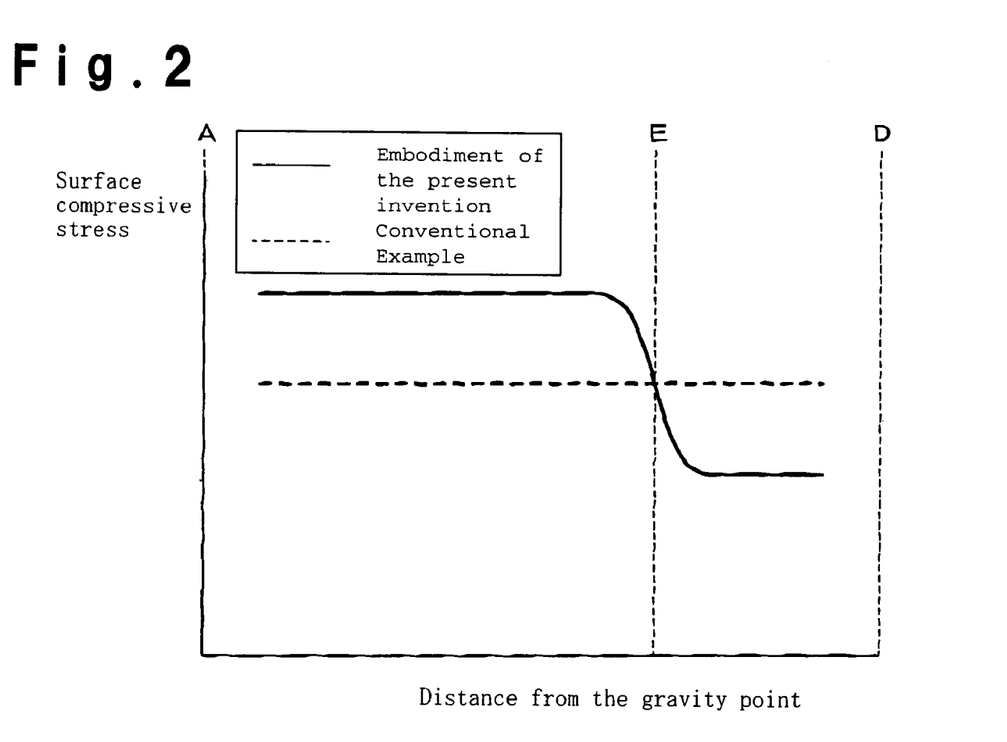
FIG. 2 is a graph showing a distribution of surface compressive stress in Embodiment 1.

FIG. 2 is a graph showing the distribution of surface compressive stress along a line 10 in FIG. 1 passing the gravity point A, a meeting point E where the elastic waves meet the cracks, and a point D at the periphery of the tempered glass sheet 1. A solid line shows the case of Embodiment 1, and a dashed line shows a case of a conventional technique. In the area 9 of Embodiment 1, the average surface compressive stress is larger than the average surface compressive stress in the peripheral region.

As shown in FIG. 2, in Embodiment 1, the surface compressive stress in the area 9 from the gravity point A to the meeting point E, is from 8 to 47% larger than the surface compressive stress in the peripheral region from the meeting point E to the point D. On the other hand, the surface compressive stress is constant over the entire region of the glass sheet in the conventional technique. In fact, in a case of a tempered glass sheet produced by blowing cooling air against a heated glass sheet from openings of a plurality of nozzles, points where flows of cooling air collide with the glass sheet (hereinafter, referred to as points just below openings) are distributed over the glass sheet, and the surface compressive stress at each of the points just below openings is different from that at a point between the points just below openings. Accordingly, the distribution of the surface compressive stress has an irregularity in the vertical direction to a certain extent.

Figure 3:
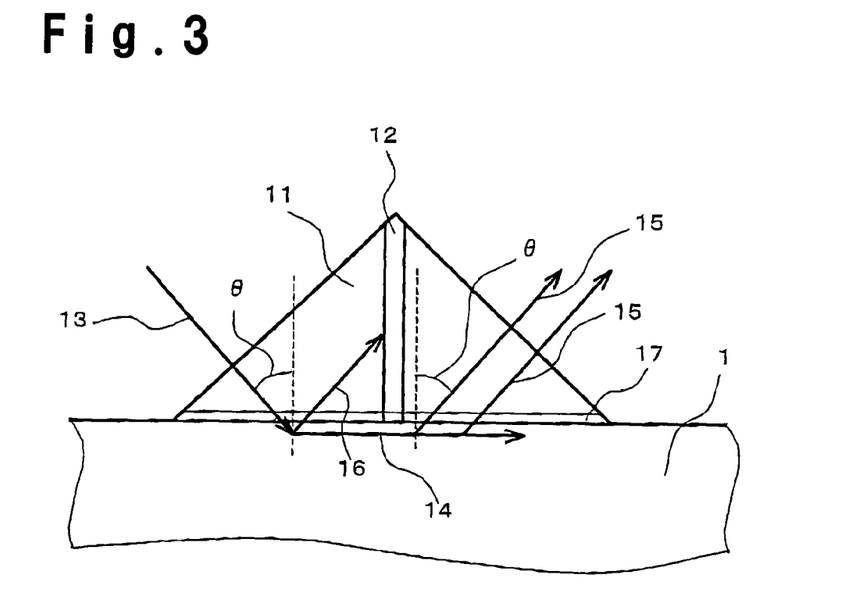
FIG. 3 is a schematic cross-sectional view illustrating the principle of a surface stress meter.

In the case of the tempered glass sheet 1 of Embodiment 1, the distribution of the surface compressive stress may fluctuate when the average surface compressive stress in the region 9 is from 8 to 47% larger than the average surface compressive stress in the peripheral region. Further, the surface compressive stress in the vicinity of the meeting point E, may change in a step form, it may change from the surface compressive stress of the region 9 to the surface compressive stress of the peripheral region with a certain slope, or it may change in a vertical direction as described above. Next, a method of measuring the surface compressive stress will be described with reference to the drawings. For the measurement of the surface compressive stress, a Babinet type surface stress meter utilizing a scattered light photoelasticity named Biascope method is employed. FIG. 3 is a schematic cross-sectional view illustrating the principle of the surface stress meter.

The surface of the tempered glass sheet 1 is covered with a liquid medium 17 having a higher refractive index than the tempered glass sheet, and a linear polarized light is incident into the tempered glass sheet 1 via a prism 11 from the medium 17 side at a critical angle θ and at a polarization plane angle of 45°. A part of incident light 13 becomes a surface propagation light 14 and propagates inside the tempered glass sheet 1 along the vicinity of the surface. The surface propagation light 14 refracts at every point of every path, and a part of it is split out at the side of the medium 17 as a refraction emission light 15. By using this refraction emission light 15, the optical path difference of the surface propagation light 14 at every points of the path is measured.

Since the incident light 13 and its reflection light 16 is usually much stronger than the surface propagation light 14, a shield plate 12 is provided at the center of the prism 11 to shield the incident light 13 and the reflection light 16 as obstacles for the measurement. As an incident linear polarized light propagates in the surface with a stress, the optical path difference between the vertically oscillating waves with respect to the surface and the horizontally oscillating waves with respect to the surface increases, and the linear polarized light takes successively forms of a linear polarized light—an elliptically polarized light—a circularly polarized light—an elliptically polarized light—a linear polarized light (where the polarization plane is in parallel with the incident light)—an elliptically polarized light—a circularly polarized light—an elliptically polarized light—a linear polarized light (where the polarization plane is in parallel with the incident light), such changes being respected. Since such change is directly reflected to the refraction emission light 15, and when the refraction emission light 15 is observed through a polarization filter, the path of the surface propagation light 14 can be observed as a series of repeated bright and dark portions.

Figure 4A:
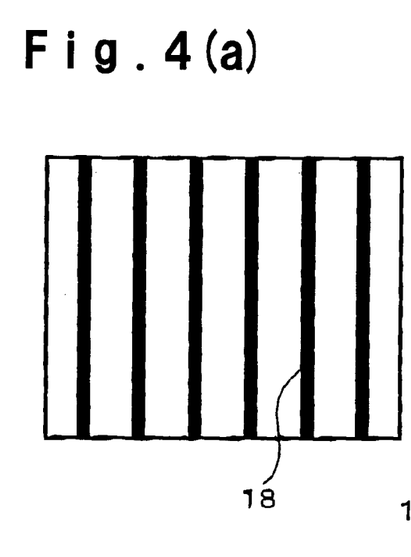
FIG. 4(a) is a schematic view showing emission light 15 observed when there is no stress.
Figure 4B:
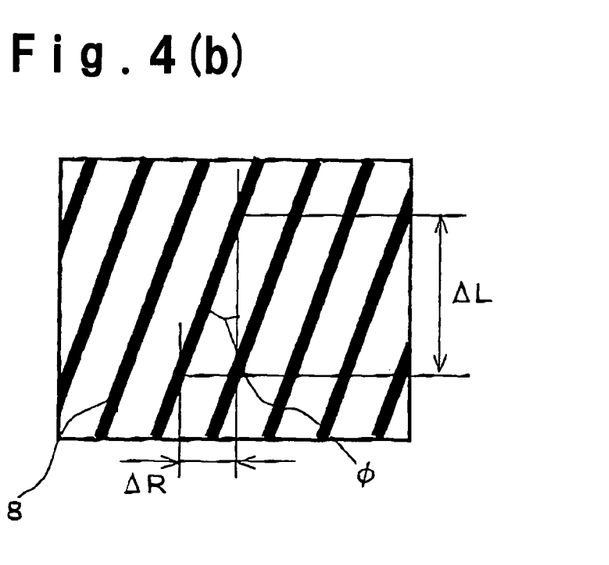
FIG. 4(b) is a conceptual view showing emission light 15 observed when there is a stress.

When a part of the refraction emission light 15 is observed through a Babinet compensator, not shown in FIG. 3, and if there is no surface compressive stress, interference fringes 18 on a quartz wedge of the Babinet compensator are observed to have no inclination as shown in FIG. 4(*a*) since the optical path difference does not change. If there is a surface compressive stress, the interference fringes 18 on the quartz wedge of the Babinet compensator continuously move rightward or leftward as the optical path difference increases, and the interference fringes 18 are observed to have an inclination.

Here, when the path of the surface propagation light 14 projected on the quartz wedge of the Babinet compensator is designated as AL, and the optical path difference generated in the path is designated as ΔR, there are provided:

$$\Delta n = \Delta R / \Delta L = \tan\phi$$

$$F = C \cdot \Delta n / KC$$

where F: surface compressive stress, C: apparatus sensitivity coefficient, Δn: optical path difference (nm/cm) and KC: photoelasticity coefficient (nm/cm/MPa)

The surface compressive stress is thus obtained.

Further, as a tool to measure the optical path difference, it is preferred to use a BTP-H surface stress meter manufactured by Orihara-Seisakusho, private limited company. It is preferred to use a prism having a contact area to glass of 11×6 mm and a maximum measurement area of 5×6 mm. The photoelasticity coefficient KC is preferably assumed to be 2.68 nm/cm/MPa for calculation.

With respect to measurement points, a point where the surface compressive stress is expected to be close to the maximum and a nearest point where the surface compressive stress is expected to be close to the minimum, are selected and measurements are made with respect to at least two perpendicularly intercrossing directions at each of those points, and the average of these measurements is designated as the measurement at the point where the surface compressive stress is expected to be close to the maximum.

In a case of a tempered glass sheet produced by blowing a cooling air against a heated glass sheet from a plurality of openings of nozzles, if the nozzle openings are disposed in a zigzag fashion, a point just below an opening of a nozzle is the point where the surface compressive stress is expected to be close to the maximum, and the gravity point of a triangle formed by the above point and other two points as mutually nearest points among points just below openings of other nozzles, is designated as a point where the surface compressive stress is expected to be close to the minimum.

In the case of the tempered glass sheet of Embodiment 1, the above measurements are made along the line 10 in FIG. 1 from the gravity point A to the point D. If there is no measurement point on the line 10, the measurements are made on measurement points nearest to the line 10 along the line 10. As a result, the average of the surface compressive stress measured in the region 9, is from 8 to 47% larger than the average of the surface compressive stress measured in the peripheral region. According to the conventional technique, the average of the surface compressive stress in the region 9, is less than 1.08 times the average of the surface compressive stress in the peripheral region. In Embodiment 1, measurement points are selected along the line 10. As a guide line to select measurement points, measurement points should be selected so that the measurement points just below nozzle openings are in line with a substantially same interval, the interval is narrow, and the line should be drawn from the gravity point A to the periphery of the glass sheet so that the maximum number of measurement points along the line can be obtained.

Here, evaluation by a fragmentation test for Embodiment 1 will be described. As described above, a tempered glass sheet employed as a windowpane for automobiles, cannot be used unless it satisfies the safety standards. Therefore, the evaluation by the fragmentation test is important. In the fragmentation test, impact points for breaking a glass are defined as from "point 1" to "point 4" in JIS R 3212. The impact point which produces largest fragments is known to be "point 3" as a substantially central point of the glass sheet from experimental and experiential facts by the inventors of the present application. Therefore, the fragmentation test was made at "point 3", namely at the gravity point A, in Embodiment 1 to compare with conventional techniques.

Figure 5:
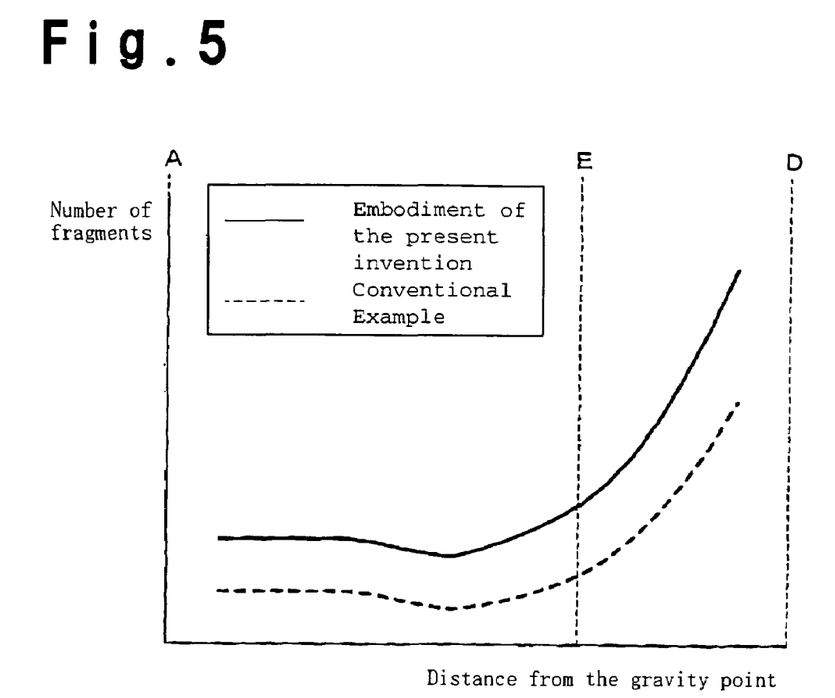
FIG. 5 is a graph showing a change of the number of fragments in a 50×50 mm square area in Embodiment 1.

FIG. 5 is a graph showing a change of the number of fragments in a 50×50 square area (area for measuring the number of fragments) when a tempered glass sheet 1 is fragmented at the gravity point A, as the center of the square area for measuring the number of fragments is moved along the line 10 from the gravity point A towards the point D in the same manner as FIG. 2. A solid line shows the case of Embodiment 1, and a dashed line shows a case by the conventional techniques. In the region 9, since the surface compressive stress of Embodiment 1 is larger than the surface compressive stress of the conventional technique, the number of fragments of Embodiment 1 is larger than that of conventional techniques. In the peripheral region, even though the surface compressive stress of Example 1 is smaller than the surface compressive stress of conventional techniques, the number of fragments of Embodiment 1 is larger. The reason is as follows. When the tempered glass sheet 1 is fragmented, the tips of the propagating cracks are influenced by the elastic waves reflected at the periphery, and the number of cracks propagating in the peripheral area is increased, whereby the number of fragments in the peripheral region becomes larger than conventional techniques even though the surface compressive stress is smaller than that of conventional techniques.

Namely, the energy for propagating the cracks in the tempered glass sheet is increased by the residual tensile stress inside the glass sheet, and the cracks branch when the propagation speed reaches a sonic speed in the glass. When tips of the cracks meet the elastic waves reflected regularly at the periphery of the glass sheet, a fluctuation of the energy is generated and it also causes branching of cracks. Therefore, the number of fragments measured in a 50×50 mm area increases in the region where the cracks propagate after they meet the elastic waves.

Therefore, a tempered glass sheet satisfies the safety standards if the residual stress in the central region is of a magnitude which produces the number of fragments satisfying the safety standards for a tempered glass sheet for automobiles, and if the strength of the peripheral region is satisfactory. A tempered glass sheet having a stress distribution like Embodiment 1 can be employed as a tempered glass sheet for automobiles satisfying the safety standards.

Here, the tempered glass sheet 1 of Embodiment 1 has a square shape, but the tempered glass of the present invention may have another shape to obtain the same effect.

Further, experiments and experiences by the present inventors have revealed that when the thickness of the tempered glass sheet 1 of Embodiment 1 is at most 2.8 mm, the average surface compressive stress needs to be at least 90 MPa in the peripheral region to keep a sufficient strength, and the average surface compressive stress is preferably at least 100 MPa in the region 9 in order to obtain a number of fragments measured in a 50×50 mm region satisfying the safety standards.

Further, the region 9 may be bigger or smaller to a certain extent. In Embodiment 1, the propagation speed of the elastic waves is assumed to be 2 times the propagation speed of cracks. However, it is confirmed from experimental and experiential facts by the present inventors that even if the propagation speed of the elastic waves is changed from 1.7 to 2.3 times the propagation speed of the cracks to determine the region 9, the performance of the tempered glass sheet does not change drastically.

Figure 6:
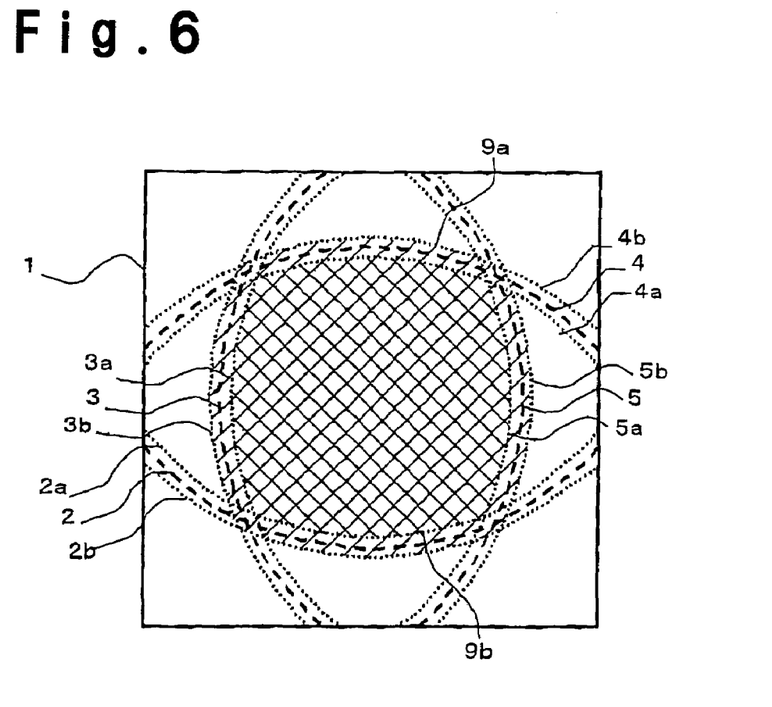
FIG. 6 is a conceptual view of the central region determined in Embodiment 1.

Namely, in FIG. 6, a dashed line 2 connecting meeting points where elastic waves reflected regularly at the lower periphery of a tempered glass sheet 1 meet cracks propagated from the gravity point A, may have a certain width defined by the dashed lines 2a to 2b, and in the same manner, other dashed lines connecting meeting points where elastic waves reflected regularly at other sides of the tempered glass sheet 1 meet cracks, may have a width as defined by 3a and 3b, 4a and 4b and 5a and 5b. Therefore, the maximum size of the region 9 is a region hatched with upward-sloping lines in FIG. 2, and the minimum size of the region 9 is a region hatched with downward-sloping lines. The region 9 may be defined within the range between the maximum and the minimum regions.

Embodiment 2

Embodiment 2 is a preferred process for producing the tempered glass sheet 1 of Embodiment 1, and will be described as follows. Embodiment 2 is a process for producing a tempered glass sheet wherein the glass sheet is heated at a temperature close to the softening point, and the surface of the glass sheet is cooled by means of a cooling means to form a compressive stress layer at the surface of the glass sheet and a tensile stress layer inside. The glass sheet to be cooled has in its front view a central region and a peripheral region. The central region is obtained by employing a computer simulation in the same manner as the method of defining the region 9 shown in FIG. 1.

The process for producing the tempered glass sheet of Embodiment 2 is such that a glass sheet to be tempered is heated at a temperature close to the softening point, and cooled by means of a cooling means under the condition that the cooling capacity of the cooling means for cooling the central region of the glass sheet is from 16 to 78% higher than the cooling capacity of the cooling means for cooling the peripheral region of the glass sheet. The cooling means for cooling the central region and the cooling means for cooling the peripheral region may be independent from each other so that the central region and the peripheral region are cooled separately, or the cooling means for cooling the central region and the cooling means for cooling the peripheral region may be the same means which is adjusted to increase the cooling capacity for the central region, or is adjusted to decrease the cooling capacity for the peripheral region.

By this method, the region 9 can be cooled faster than the peripheral region, whereby the temperature difference between the inside and the surface in the cross-sectional direction of the glass sheet being cooled, is larger in the central region than that in the peripheral region. Accordingly, the residual stress formed in the central region becomes larger than the residual stress formed in the peripheral region, whereby the tempered glass sheet 1 of Embodiment 1 can be produced.

Further, there are many fine cracks in chamfered portions at peripheries of a glass sheet, and a cooling destruction often takes place by the cracks grown from these portions. According to the above process for producing a tempered glass sheet, since the peripheral region is cooled slower than the central region in a state that the cooling means provides a high cooling capacity to the central region while it provides a low cooling capacity to the peripheral region, a tensile stress generated at surface of the glass sheet immediately after the start of cooling the peripheral region, is reduced, and therefore, a cooling destruction originated at the peripheral region can be reduced.

The cooling means may be an air-cooling which blows a cooling-air to the glass sheet, may be a mist-cooling which blows a mist to the glass sheet, or may be a contact-cooling which makes an object to be used as a coolant contact directly with the glass sheet.

Further, when a glass sheet is heated, if the central region is heated at a higher temperature than the peripheral region and cooled with a substantially uniform cooling capacity over the glass sheet, a similar tempered glass sheet can be obtained. In this case, since the temperature of the peripheral region is substantially same as that of the conventional method, the problem that the conveying of the glass sheet heated at the high temperature is difficult can be solved.

Embodiment 3

An embodiment of a preferred apparatus for carrying out the process for producing a tempered glass sheet of Embodiment 2 will be described.

In Embodiment 3, an apparatus for producing a tempered glass sheet comprises at least wind boxes disposed at both sides of a heated glass sheet and facing each other, and a plurality of nozzles disposed on the glass sheet side of the wind boxes, whereby a cooling air blown from the plurality of nozzles is blown to the heated glass sheet. The plurality of nozzles are disposed on the wind boxes so that openings of the nozzles open perpendicularly to the glass sheet and arranged in a zigzag fashion, and so that the arrangement of the nozzles substantially fits the shape of the glass sheet and the cooling air blown from the openings can be blown to the entire glass sheet.

Figure 7:
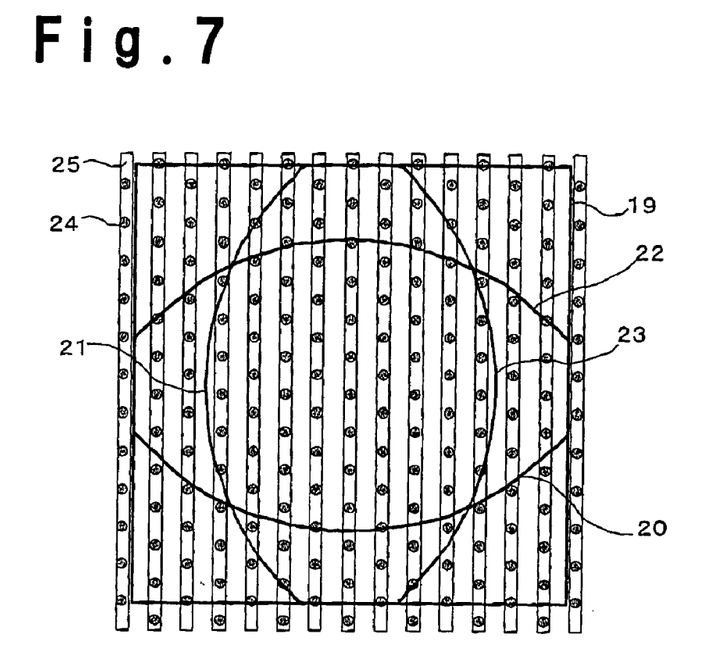
FIG. 7 is a schematic view illustrating the positional relationship between the central region of Embodiment 3 and nozzle openings.

FIG. 7 is a schematic view illustrating the positional relationship between the central area of a glass sheet 19 and nozzle openings. The glass sheet 19 shown in FIG. 7 has a square shape and has in its front view a central region and a peripheral region.

Firstly, a computer simulation is performed in the same manner as the method of determining the area 9 shown in FIG. 1, to determine the central region of the glass sheet 19 to be tempered. Here, the central region determined may be at any position within the range shown in FIG. 6. Secondly, nozzle openings which blow cooling air for cooling the central region of the glass sheet 19 when the heated glass sheet 19 is cooled, are identified. The positional relationship obtained is shown in FIG. 7.

FIG. 7 is a schematic view illustrating the positional relationship between the glass sheet 19 in which lines 20 to 23 where cracks meet elastic waves, and a plurality of nozzles 25 each provided with a plurality of openings 24 and disposed on a wind box to be used in Embodiment 3.

The line 20 is a line formed by connecting meeting points where cracks meet elastic waves reflected at a lower periphery of the glass sheet 19 when the glass sheet 19 is fragmented at its gravity point, and the line 21 is a line formed by connecting points where cracks meet and elastic waves reflected at a left periphery of the glass sheet 19, the line 22 is a line formed by connecting points where cracks meet elastic waves reflected at an upper periphery of the glass sheet 19, and the line 23 is a line formed by connecting points where cracks meet elastic waves reflected at a right periphery of the glass sheet 19. The region obtained in FIG. 7 shows an area to increase the cooling capacity, and nozzles within this region are designated as nozzles of the central region.

Figure 8:
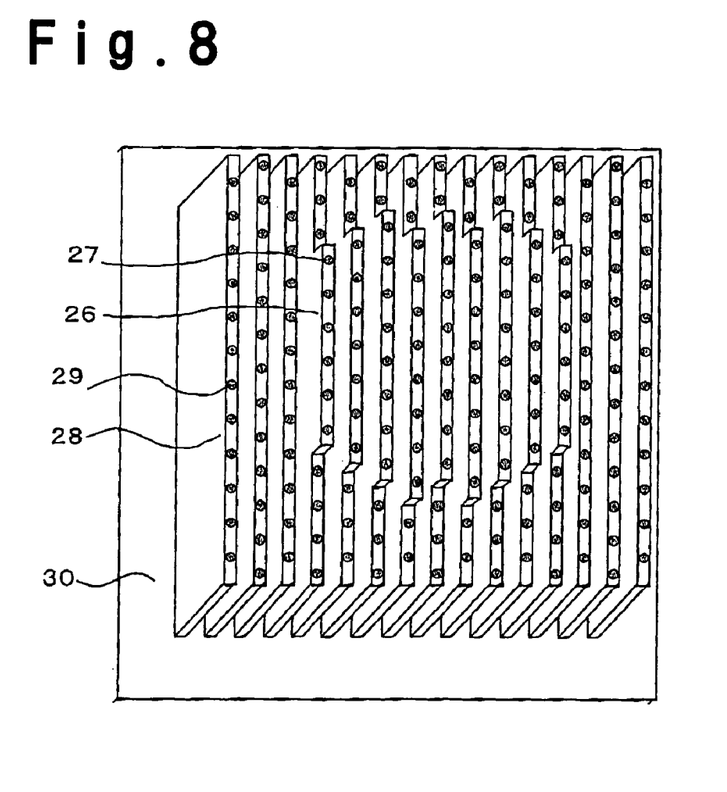
FIG. 8 is a schematic perspective view showing nozzle openings used in Embodiment 3.

In Embodiment 3, the nozzles for the central region are extended so that the distance from their openings to the glass sheet 19 is smaller than that for the nozzles in the peripheral region, whereby the cooling capacity for the central region is higher than the cooling capacity for the peripheral region. FIG. 8 is a schematic perspective view of a wind box whose nozzles 26 of the central region are extended. In Embodiment 3, nozzles 26 for the central region are from 10 to 50 mm extended from nozzles 28 of the peripheral region. The openings 27 in the central region are distributed to have the same pitch as the openings in the peripheral region in the front view. By extending the nozzles for the central region, the cooling capacity in the central region is from 16 to 78% higher than the cooling capacity for the peripheral region. Especially when the thickness of the glass sheet 19 is at most 2.8 mm and the temperature of the glass sheet 19 at the start of cooling is 640° C., the cooling capacity in the central region is preferably at least 520 W/cm$^{2}$° C., and the cooling capacity in the peripheral region is preferably at least 350 W/cm$^{2}$° C.

Figure 9:
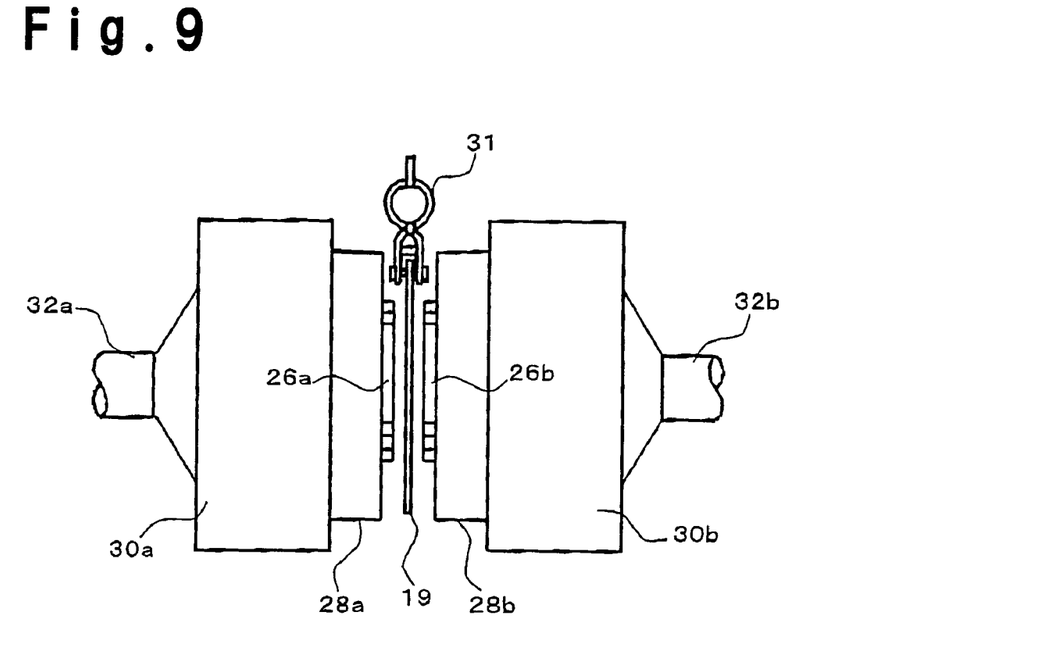
FIG. 9 is a schematic side view illustrating an apparatus for producing a tempered glass sheet used in Embodiment 3.

FIG. 9 is a schematic side view illustrating an apparatus for producing a tempered glass sheet of Embodiment 3 of the present invention employing the wind box of FIG. 8. The apparatus for producing a tempered glass sheet of Embodiment 3 comprises at least wind boxes 30a and 30b disposed at both sides of the glass sheet 19 and facing each other, and a plurality of nozzles 26a, 26b, 28a and 28b disposed on the wind boxes 30a and 30b at a side of the glass sheet 19, whereby a cooling air supplied from pipes 32a and 32b is blown from openings of the plurality of nozzles 26a, 26b, 28a and 28b against the heated glass sheet 19. In FIG. 9, the glass 19 having no curved or shaped portion is used. However, the glass sheet 19 may be curved so long as the shapes of the nozzles and the wind boxes are modified according to the curvature of the glass sheet so that the distance between the tips of the nozzles and the glass sheet is constant.

A glass sheet 19 heated at a temperature close to the softening point in a furnace, is conveyed to a position between the wind boxes 30a and 30b. In this case, the glass sheet 19 is held vertically with a conveying means comprising a hanger 31 connected to a driving mechanism, to be conveyed to the position between the wind boxes 30a and 30b. When the glass sheet 19 is conveyed to the position between the wind boxes 30a and 30b, a cooling air is blown from the openings of each of the nozzles to the glass sheet 19. Thus, by making the cooling capacity in the central region higher than the peripheral region and cooling the glass sheet 19, the apparatus according to Embodiment 3 can produce a tempered glass sheet of Embodiment 1, whose residual stress formed in the central region is from 8 to 47% larger than the residual stress formed in the peripheral region.

Further, since the cooling capacity for the central region of the glass sheet 19 is high while the cooling capacity for the peripheral region remains low, peripheral region is cooled slower than the central region, whereby the tensile stress produced at the surface of the glass sheet 19 immediately after the start of cooling the peripheral region is reduced, and a cooling destruction originated from the peripheral region can be reduced.

Further, since the apparatus for producing a tempered glass sheet in Embodiment 3 can be achieved simply by extending the nozzles, no major modification or expansion is required to the cool-air tempering device itself, and cost for the modification can be minimized.

Embodiment 4

Figure 10:
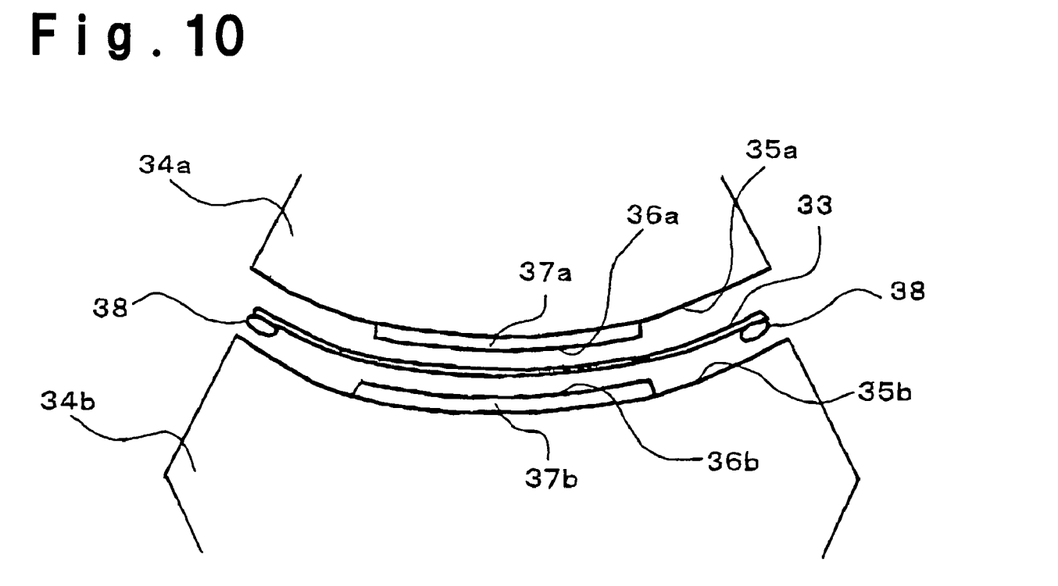
FIG. 10 is a schematic cross-sectional view of an apparatus for producing a tempered glass sheet in Embodiment 4.

In Embodiment 4, instead of cooling a glass sheet hanged vertically in Embodiment 3, an apparatus for producing a tempered glass sheet by cooling a shaped or curved glass sheet placed horizontally on a ring, will be described. FIG. 10 is a schematic cross-sectional view illustrating an embodiment of the apparatus for producing a tempered glass sheet according to Embodiment 4. The apparatus for producing a tempered glass sheet shown in FIG. 10, comprises wind boxes 34a and 34b disposed on both sides of a glass sheet 33 and facing each other, and a plurality of nozzles disposed on the wind boxes 34a and 34b at a side of the glass sheet 33, whereby a cooling air blown from the plurality of nozzles is blown to the heated glass sheet 33.

The plurality of nozzles are disposed on the wind boxes 34a and 34b so that openings of the nozzles open perpendicularly to the glass sheet 33 and form a zigzag arrangement so as to meet substantially the shape of the glass sheet 33, whereby the cooling air blown from the openings can be blown over the entire glass sheet 33. The tips of the plurality of nozzles are indicated by numerals 35a, 35b, 36a and 36b in FIG. 10.

The glass sheet 33 has a shape suitable for an windowpane of automobiles, and has in its front view a central region and a peripheral region. The central region can be determined by a computer simulation in the same manner as the method to determine the region 9 shown in FIG. 1.

In a conventional apparatus for producing a tempered glass sheet, distances between a glass sheet 39 and nozzle tips 41a and 41b are constant over the glass sheet. On the other hand, in the apparatus for producing a tempered glass in Embodiment 4, tips 36a and 36b of nozzles 37a and 37b for cooling the central region of the glass sheet 33 are from 10 to 50 mm closer to the glass sheet 33 than nozzle tips 35a and 35b for cooling the peripheral region of the glass sheet 33.

The glass sheet 33 heated at a temperature close to the softening point in a furnace, bent and shaped as the case requires, is conveyed to the position between the wind boxes 34a and 34b. In this case, the glass sheet 33 is horizontally held by an appropriate conveying means such as a ring 38 connected to a driving means and conveyed to the position between the wind boxes 34a and 34b.

When the glass sheet 33 is conveyed to the position between the wind boxes 34a and 34b, a cooling air having predetermined temperature and pressure is blown from openings of each of the nozzles towards the glass sheet 33. Thus, by making the tips 36a and 36b of the nozzles 37a and 37b for blowing air to the central region, from 10 to 50 mm closer to the glass sheet 33 than the nozzle tips 35a and 35b for blowing air to the peripheral region, the glass sheet can be cooled with a cooling capacity for the central region form 16 to 78% higher than that for the peripheral region, whereby a tempered glass sheet having a residual stress formed in the central region from 8 to 47% larger than the residual stress formed in the peripheral region, can be produced. Particularly, when the thickness of the glass sheet 33 is at most 2.8 mm and the temperature of the glass sheet 33 at the start of the cooling is 640° C., the cooling capacity in the central region is preferably at least 520 W/cm$^{2\circ}$ C., and the cooling capacity for the peripheral region is preferably at least 350 W/cm$^{2\circ}$ C.

Further, since the cooling capacity for the central region of the glass sheets 33 is high while the cooling capacity for the peripheral region remains low, the peripheral region is cooled slower than the central region, whereby a tensile stress formed at the surface of the glass sheet 33 just after the start of cooling the peripheral region is reduced, and cooling destructions originated at the peripheral region can be reduced.

Further, at a time of tempering a glass sheet having a complex curved plane, if all of the nozzle tips 41a and 41b are made closer to the glass sheet 39, there is a risk that a nozzle tip 41b contacts with a cooling ring 42 as a jig to hold the glass sheet 39 being quenched. Therefore, there is a limitation in terms of proximity, and it is impossible to slide horizontally the glass sheet 39. However, by only making nozzle tips 36a and 36b for the central region closer to the glass sheet as shown in FIG. 1, the above problems i.e., the contact with the cooling ring 38 and the incapability of slide, can be solved.

Further, since the apparatus in Embodiment 4 is achieved simply by extending nozzle tips, there is no major modification or extension required to a cool-air tempering apparatus itself, and cost for the apparatus can be minimized.

As described above, the following effects can be obtained by the present invention. In a tempered glass according to the present invention, since an average surface compressive stress in the central region is larger than that in the peripheral region, there is a merit that only the cooling capacity for the central region needs to be increased, and therefore, the tempered glass sheet is easy to produce. Namely, tips of nozzles for blowing a cooling medium can be placed away from the glass sheet for the peripheral region than the central region, and accordingly, the contact of nozzle tips with an edge of the glass at a time of sliding the glass sheet can be prevented.

Further, by making the average surface compressive stress in the peripheral region to be at least 90 MPa, and by making the average surface compressive stress in the central region to be from 8 to 47% larger than the peripheral region, a residual stress in a level of satisfying safety standards can be formed in a glass sheet.

Further, in the process for producing a tempered glass sheet of the present invention, by making the cooling capacity of the cooling means for cooling the central region of a tempered glass sheet from 16 to 78% higher than the cooling capacity of the cooling means for cooling the peripheral region when the tempered glass sheet is quenched, it is possible to produce a tempered glass sheet whose residual stress in the central region is from 8 to 47% higher than the residual stress in the peripheral region. Further, since the cooling capacity for the central region is high while the cooling capacity for the peripheral region remains low, the peripheral region is cooled slower than the central region, whereby a tensile stress formed in the glass sheet just after the start of cooling the peripheral region can be reduced, and destruction of the glass sheet at a time of blowing a cooling medium can be prevented.

Further, in the apparatus for producing a tempered glass sheet according to the present invention, by extending tips of nozzles for cooling the central region of a tempered glass sheet from 10 to 50 mm longer than nozzle tips for cooling the peripheral region at a time of quench, the cooling capacity of the cooling means for cooling the central region of the tempered glass sheet is from 16 to 78% higher than the cooling capacity of the cooling means for cooling the peripheral region, whereby a tempered glass sheet having a residual stress of central region from 8 to 47% larger than the residual stress of peripheral region can be produced, and the cooling destruction can be reduced. Further, since nozzles are simply extended, there is no major modification or extension required to an existing apparatus for producing, and therefore, it is easily achieved with a low cost.

The entire disclosure of Japanese Patent Application No. 2002-201496 filed on Jul. 10, 2002 including specification, claims, drawings and summary is incorporated herein by reference in its entirety.

What is claimed is:

1. A tempered glass sheet comprising a residual compressive stress layer formed at a surface of the glass sheet and a residual tensile stress layer formed inside the glass sheet to increase strength of the glass sheet by a balance of residual stresses in these layers,
   wherein the tempered glass sheet has in its front view a peripheral region including its periphery and a central region occupying an inside of the peripheral region, and an average surface compressive stress in the central region is larger than an average surface compressive stress in the peripheral region, and
   wherein the average surface compressive stress is at least 90 MPa in the peripheral region of the tempered glass sheet.

2. The tempered glass sheet according to claim 1, wherein a thickness of the tempered glass sheet is at most 2.8 mm, the average surface compressive stress in the central region is at least 100 MPa, and the average surface compressive stress in the peripheral region is at least 90 MPa.

3. The tempered glass sheet according to claim 1,
   wherein a border between the central region and the peripheral region is defined by lines connecting points where tips of cracks propagating from a gravity point towards the peripheral region when the tempered glass sheet is fragmented at the gravity point, meet elastic waves generated at a same time with the cracks, propagated at a speed of 1.7 to 2.3 times as much as a speed of the cracks and reflected regularly at the periphery of the tempered glass sheet.

4. The tempered glass sheet according to claim 3, wherein the average surface compressive stress in the central region is from 8 to 47% larger than the average surface compressive stress in the peripheral region.

5. The tempered glass sheet according to claim 1, wherein the average surface compressive stress in the central region is from 8 to 47% larger than the average surface compressive stress in the peripheral region.

6. The tempered glass sheet according to claim 5,
   wherein a thickness of the tempered glass sheet is at most 2.8 mm, the average surface compressive stress in the central region is at least 100 MPa, and the average surface compressive stress in the peripheral region is at least 90 MPa.

7. A tempered glass sheet comprising a residual compressive stress layer formed at a surface of the glass sheet and a residual tensile stress layer formed inside the glass sheet to increase strength of the glass sheet by a balance of residual stresses in these layers,
   wherein the tempered glass sheet has in its front view a peripheral region including its periphery and a central region occupying an inside of the peripheral region, and an average surface compressive stress in the central region is larger than an average surface compressive stress in the peripheral region, and
   wherein a thickness of the tempered glass sheet is at most 2.8 mm, the average surface compressive stress in the central region is at least 100 MPa, and the average surface compressive stress in the peripheral region is at least 90 MPa.

8. The tempered glass sheet according to claim 7, wherein the average surface compressive stress in the central region is from 8 to 47% larger than the average surface compressive stress in the peripheral region.

9. The tempered glass sheet according to claim 7,
   wherein a border between the central region and the peripheral region is defined by lines connecting points where tips of cracks propagating from a gravity point towards the peripheral region when the tempered glass sheet is fragmented at the gravity point, meet elastic waves generated at a same time with the cracks, propagated at a speed of 1.7 to 2.3 times as much as a speed of the cracks and reflected regularly at the periphery of the tempered glass sheet.

10. The tempered glass sheet according to claim 9, wherein the average surface compressive stress in the central region is from 8 to 47% larger than the average surface compressive stress in the peripheral region.

* * * * *